United States Patent [19]

Kobayashi et al.

[11] Patent Number: 4,840,080

[45] **Date of Patent: * Jun. 20, 1989**

[54] DRIVING DEVICE EMPLOYED IN A WINDOW REGULATOR

[75] Inventors: Tetuo Kobayashi, Ikeda; Shoichi Hirai, Nishinomiya, both of Japan

[73] Assignee: Nippon Cable System, Inc., Takarazuka, Japan

[*] Notice: The portion of the term of this patent subsequent to Dec. 16, 2003 has been disclaimed.

[21] Appl. No.: 180,646

[22] Filed: Apr. 7, 1988

Related U.S. Application Data

[63] Continuation of Ser. No. 906,360, Sep. 10, 1986, abandoned, which is a continuation of Ser. No. 669,493, Nov. 8, 1984, Pat. No. 4,628,759.

[30] Foreign Application Priority Data

Feb. 21, 1984 [JP] Japan ................................ 59-24043
Feb. 21, 1984 [JP] Japan ................................ 59-32024

[51] Int. Cl.[4] ................................................ F16C 1/10

[52] U.S. Cl. .............................. 74/501.5 R; 74/500.5; 74/505; 74/506; 49/352; 49/360; 242/54 R; 254/365

[58] Field of Search ............... 74/501.5 R, 500.5, 505, 74/504, 506; 49/352, 360; 242/54 R; 254/364, 365

[56] References Cited

U.S. PATENT DOCUMENTS

| | | | |
|---|---|---|---|
| 2,429,313 | 10/1947 | Gilbert | 74/526 |
| 2,607,581 | 8/1952 | Love et al. | 74/500.5 |
| 3,110,380 | 11/1963 | Meyer et al. | 74/501.5 R |
| 3,288,254 | 11/1966 | Replogle | 188/82.7 |
| 4,216,624 | 8/1980 | Blankenburg et al. | 49/352 |
| 4,306,378 | 12/1981 | Fukura et al. | 49/352 |
| 4,400,993 | 8/1983 | Kobayashi et al. | 74/501.5 |
| 4,406,420 | 9/1983 | Villano | 242/54 R |
| 4,440,354 | 4/1984 | Kobayashi et al. | 242/54 |
| 4,503,732 | 3/1985 | Schust | 74/625 |
| 4,628,759 | 12/1986 | Kobayashi et al. | 74/506 |

FOREIGN PATENT DOCUMENTS

| | | | |
|---|---|---|---|
| 3000635 | 7/1981 | Fed. Rep. of Germany | 74/501.5 |
| 49-2336 | 1/1974 | Japan | 74/501.5 |

*Primary Examiner*—Richard E. Moore
*Assistant Examiner*—Vinh Luong
*Attorney, Agent, or Firm*—Armstrong, Nikaido, Marmelstein, Kubovcik & Murray

[57] ABSTRACT

A driving device employed in a window regulator comprising: a driving member including a shaft and an associating member having at least a notch portion; a drum adjacent to said associating member and having an associating projection capable of associating with said notch portion with some play in the rotational direction; and an elastic member urging said associating member in the rotational direction. The shaking of the crank lever can be surely inhibited.

6 Claims, 9 Drawing Sheets

DRIVING DEVICE EMPLOYED IN A WINDOW REGULATOR

This application is a continuation of application Ser. No. 906,360, filed Sept. 10, 1986, now abandoned, as a continuation of application Ser. No. 669,493, filed Nov. 8, 1984, now U.S. Pat. No. 4,628,759, issued dated Dec. 16, 1986.

BACKGROUND OF THE INVENTION

The present invention relates to a driving device employed in a window regulator (hereinafter referred to as "driving device"), and, more particularly, to the driving device which can surely prevent a crank lever from shaking due to vibration of a car, or the like, or which can always maintain tension of wires in a suitable range.

Until now, a window regulator shown in FIG. 14 has been known. Namely, the window regulator comprises two wires 51, 52 being laid in the window regulator in tense condition; a driving device 54 having a drum 53, for winding the wires 51, 52 in the opposite directions, to which one end of each wire is connected; and a driven device 57 having a carrier plate 56, capable of sliding on a guide rail 55, to which the other end of each wire 51, 52 is connected. When the drum 53 is rotated in the direction of Arrow A or B, one of the wires 51, 52 is wound around the drum 53 and the other wire is unwound from the drum 53, and as a result, the carrier plate 56 moves in the direction of Arrow C or D.

However, elastic elongation and permanent elongation generally generate in the wires, such as stranded metallic wires, in the course of the operation. If permanent elongation and/or looseness generate in the wire, tension of the wires is lost and it is impossible for the driving device 54 to correctly transmit the operational force to the driven device 57. With respect to the above described window regulator, mechanisms for automatically eliminating permanent elongation generated in the wires are discussed in U.S. Pat. Nos. 4,400,993 and 4,440,354.

The mechanisms basically comprise two divided drums, i.e. a first drum and a second drum having ratchet teeth 63, 64 at each facing side, as indicated by two-dot chain line in FIG. 14. The mechanisms can eliminate permanent elongation by means of relative rotation of the first drum **53*a* and the second drum 53*b***.

However, in case that such mechanisms are employed in the driving device, excess elastic elongation is generated occasionally. For example, when sliding resistance between the carrier plate 56 and the guide rail 55 increases temporarily, or when the crank lever is rotated in the direction of Arrow B after the first wire 51 has entirely wound up, (i.e. after the carrier plate 56 reaches the stopper 58), the relative rotation of the first drum **53*a* and the second drum 53*b* is excessively performed. As a result, excessive elastic elongation generates in the first wire 51 (and the second wire 52). Further, as a result, the mesh of the ratchet teeth 63, 64 might advance in a state of eliminating suitable play. It is disadvantageous that such excessive elastic elongation of the wires causes permanent elongation, and causes the pulley 59 and rotational shafts of other connecting members to be bended, and causes the operation of the crank lever 61** to be heavy.

Also, in case that the crank lever is rotated in the direction of Arrow A, one fact that the above sliding resistance increases, or another fact that the crank lever is rotated in the direction of Arrow A after the carrier plate 56 has reached the opposite stopper 60 causes the ratchet teeth 63, 64 to fly over with each other, in spite of meshing direction of both ratchet teeth (this phenomenon is hereinafter referred to as "flying phenomenon"). The flying phenomenon causes wires to be loosed. By means of wearing out addendums of the ratchet teeth 63, 64, it tends to occur the flying phenomenon.

By the way, a mechanism for eliminating permanent elongation or looseness of wires, having a brake spring located between the driving shaft 65 and the drum 53, has been known.

The brake spring 92 shown in FIG. 15 is employed to prevent a window glass from being raised or lowered, except that the crank lever 61 or the shaft 96 is positively rotated. In such driving device, operations of the brake spring 92 are, as described later, realized by means of association of a notch portion 95 of a associating member 94 and a associating projection 97 of the drum 54 with some play, for example, an angle of 30 degrees, in the rotational direction. In that case, the drum 54 is not fixed to the shaft 96, and the associating member 94 is fixed to the shaft 96.

As shown in FIG. 15, when the crank lever 61 is rotated in the direction of Arrow B, one side surface **95*a* of the notch portion 95 pushes a nail 92*a* of the brake spring 92 in the direction of Arrow B. Accordingly, the locking operation of the brake spring (due to the frictional resistance of the brake spring and an inner peripheral surface of the housing) is released, since the diameter of the brake spring 92 is reduced. Accordingly, since the rotation of the associating member 94 causes the notch portion 95 and the associating projection 97 to associate with each other, the drum 54** can be rotated in the direction of Arrow B.

A rotation of the crank lever 61 in the direction of Arrow A also causes the locking operation of the brake spring to be unlocked.

Even if one tries to raise or lower the window glass G without rotating the crank lever 61, the brake spring 92 performs the locking operation, since the diameter of the brake spring 92 increases, and the associating projection 97 of the drum **54*a* pushes the nail 92*a* or 92*b* of the brake spring 92**.

As described above, as to the locking operation or the unlocking operation, it is necessary for one nail to move to some extent before the other nail moves for the purpose of increasing or decreasing the diameter of the brake spring. For the purpose, it is necessary to have some play between the associating projection 97 and the notch portion 95 in the rotational direction. If there is no play between them, both of the nails **92*a*, 92*b* are rotated at the same time, namely the diameter of the brake spring 92** cannot be increased or decreased. Accordingly, the locking operation and the unlocking operation do not operate.

Accordingly, the shaft 96 is rotatable in the range of the play against the housing 111 without rotating the drum 54 itself. In that case, the crank lever 61 fixed to the end 85 of the shaft 96 is shakable by an angle of about 30 degrees.

Thus, when the window regulator is installed in a car, or the like, there is a problem that the crank lever 61 shakes or makes a noise due to vibration of a car, or the like. The problem causes a driver to feel some displeasure.

Further, the shaking of the crank lever 61 causes the nails 92*a,* 92*b* of the brake spring 92 to repeatedly receive impulse force. There is another problem that the repeated impulse force causes the nails 92*a,* 92*b* to sustain a damage of fatigue. Therefore, the operation of the window regulator cannot be performed.

As a method for solving the above problems, it is thinkable to increase a frictional resistance of the shaft 96 and the housing 91 or a frictional resistance of the shaft 96 and the drum 54, but it is difficult to maintain the frictional resistance in a suitable range, and it is not useful to increase the frictional resistance because of making operational force to be heavy, and further, because of wearing out the sliding portion.

"Idling movement" or "move idly" described in the specification means that, when a torque due to the relative rotation of a first ratchet teeth and a second ratchet teeth by means of rotating a crank lever is generated, slant portions of the first ratchet teeth and the second ratchet teeth slip in the rotational direction with each other, and both ratchet teeth moves axially in the opposed direction with each other, at last the ratchet teeth engage again. Further, the conception of "idling movement" or "move idly" includes not only a case that one ratchet teeth moves in the axial direction and rotates around the axis, but also various cases, e.g. the case that one ratchet teeth moves in the axial direction and the other ratchet teeth rotates around the axis, or the case that both of the ratchet teeth move axially so as to depart away with each other, and one or both ratchet teeth rotate around the axis in the opposite directions.

OBJECT OF THE INVENTION

A main object of the present invention is to provide a driving device employed in a window regulator which can surely prevent a crank lever from shaking.

Another object of the present invention is to provide a driving device employed in a window regulator which can always maintain tension of wires in a suitable range.

SUMMARY OF THE INVENTION

In accordance with the present invention, there can be provided a driving device employed in a window regulator comprising:

(a) a housing;

(b) a driving member including a shaft provided for rotational movement within the housing and an associating member beng fixed to the shaft, the associating member extending from the shaft in the radial direction and having at least one notch portion along a peripheral edge of the associating member;

(c) a drum being provided within the housing, being adjacent to the associating member, being coaxial with the shaft, being rotatable around the shaft, and having an associating projection, the associating projection being mounted on a first side surface of the drum facing to the associating member, and being capable of associating with the notch portion with some play in the rotational direction; and (d) an elastic member urging the associating member in the rotational direction, by means of engaging one end of the elastic member with the drum and by means of engaging the other end of the elastic member with the driving member.

Further, in accordance with the present invention, there can be provided a driving device employed in a window regulator comprising:

(a) a housing;

(b) a driving member including a shaft provided for rotational movement within the housing and an associating member, being fixed to the shaft, the associating member extending from the shaft in the radial direction and having at least a notch portion along a peripheral edge of the associating member;

(c) a drum being provided within the housing, being adjacent to the associating member, being coaxial with the shaft, being rotatable around the shaft, being axially movable along the shaft, and having an associating projection, the associating projection being mounted on a first side surface of the drum facing to the associating member, being capable of associating with the notch portion with some play in the rotational direction, and having a first ratchet teeth on a second side surface of the drum opposite to said first side surface of the drum;

(d) a ratchet member being provided within the housing adjacent to the drum, being coaxial with the shaft, being rotatable around the shaft, and having a second ratchet teeth on a first side surface of the ratchet member facing to the drum, the second ratchet teeth being capable of being meshed with the first ratchet teeth;

(e) a spiral spring being located between the ratchet member and the housing so as to urge the ratchet member in the direction of idling movement of the first ratchet teeth and the second ratchet teeth;

(f) an elastic member located between the drum and the associating member so as to urge the associating member in the rotational direction;

(g) a first wire having an end engaged with the drum and a second wire having an end engaged with the ratchet member; and (h) a first pushing projection and a second pushing projection being mounted on both low sides of the associating projection and being capable of being inserted between bottom surfaces of the associating member and the first side surface of the drum, respectively. Whereby, looseness and permanent elongation can be eliminated, tension of the wires is maintained in a suitable range between flying phenomenon is inhibited, and the shaking of a crank lever is surely avoided.

The above and other objects and advantages of the present invention will become apparent from the following description with reference to the accompanying drawings.

DETAILED DESCRIPTION OF THE INVENTION

Figure 1:
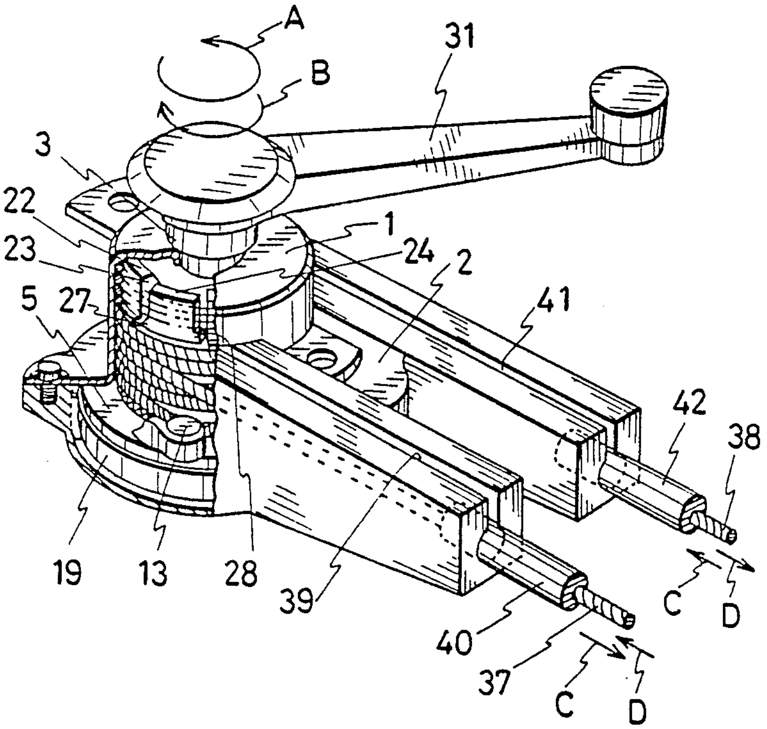
FIG. 1 is a perspective view showing an embodiment of the driving device of the invention.
Figure 2:
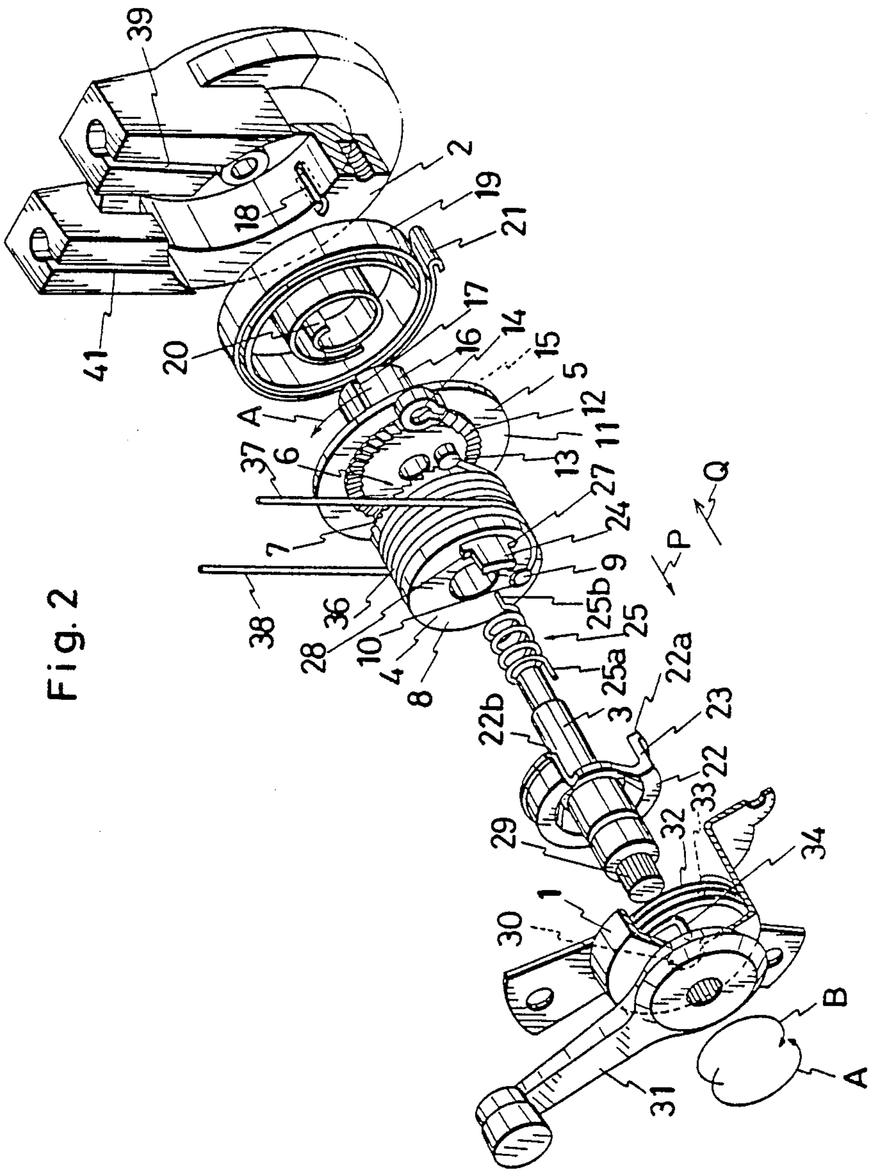
FIG. 2 is an exploded view in perspective of the embodiment of the driving device of the invention shown in FIG. 1.

In FIG. 1 and FIG. 2, numerals 1,2 indicate a first housing and a second housing, respectively. A housing consists of the first housing 1 and the second housing 2. The housing contains and supports a rotatable shaft 3. A drum 4 and a ratchet plate 5 are rotatably mounted on the shaft 3 adjacently to each other. The drum 4 is also capable of moving in the axial direction along the shaft 3.

A second side surface 6 of the drum 4 is provided with a first ratchet teeth 7. A first side surface 8, which is an opposite surface to the second side surface 6, is provided with a first engaging portion 10 capable of being engaged with a first wire end 9. A first side surface 11, which is adjacent to the drum 4, of the ratchet plate 5 is provided with a second ratchet teeth 12 capable of being meshed with the first ratchet teeth 7. Further, the first side surface 11 is provided with a second engaging portion 14 capable of being engaged with a second wire end 13.

On a second side surface 15 of the ratchet plate 5, a boss 16 provided with a first engaging groove 17 is projected. Also, an inner peripheral surface of the second housing 2 is provided with a second engaging groove 18.

A spiral spring 19 is contained within the second housing 2. Both ends 20, 21 of the spiral spring 19 are inserted into the first engaging groove 17 and the second engaging groove 18, respectively. The spiral spring 19 urges the ratchet plate 5 in the direction of idling movement, i.e. in the direction of Arrow A.

A cup-like associating member 22 is fixed to the shaft 3, and a fan-shaped notch portion 23 is formed on the cylindrical side portion of the associating member 22. A driving member consists of the shaft 3 and the associating member 22. The first side surface 8 of the drum 4 is provided with a associating projection 24 capable of associating with the notch portion 23 of the associating member 22 with some play in the rotational direction.

An end 29 of the shaft 3 is inserted into a perforation 30 of the first housing 1, and a crank lever 31 is fixed to the end 29. Further, a conventional brake spring 32 is set between an outer peripheral surface of the associating member 22 and an inner peripheral surface of the first housing 1, and both ends 33, 34 of the brake spring 32 are inserted into gaps existing between the notch portion 23 and the associating projection 24, respectively.

Both low sides of the associating projection 24 are provided with a first pushing projecton 27 and a second pushing projection 28 (shown in FIG. 2).

The first pushing projection 27 is located on the side portion where the rotation of the associating member 22 in the direction of meshing of the ratchet teeth 7, 12 causes the notch portion 23 to push the associating projection 24. An upper portion (indicated as 27*a* in FIG. 9*a*) of the first pushing projection 27 is preferably tapered, so that it is easy for the first pushing projection 27 to slide into a gap between the bottom surface 22*a* of the associating member 22 and the first side surface 8 of the drum 4, i.e. it is easy for the drum 4 to axially move toward the ratchet plate 5. Whereby, the later described operation of eliminating looseness of wires is made easy. When the notch portion 23 associates with the associating projection 24 due to rotation of the crank lever 31, there generates an axial force in the direction of Arrow Q, so that a pushing force of the drum 4 toward the ratchet plate 5 is increased, and therefore, the mesh of the ratchet teeth 7, 12 is more ensured. Accordingly, the flying phenomenon is more effectively inhibited.

Figure 10:
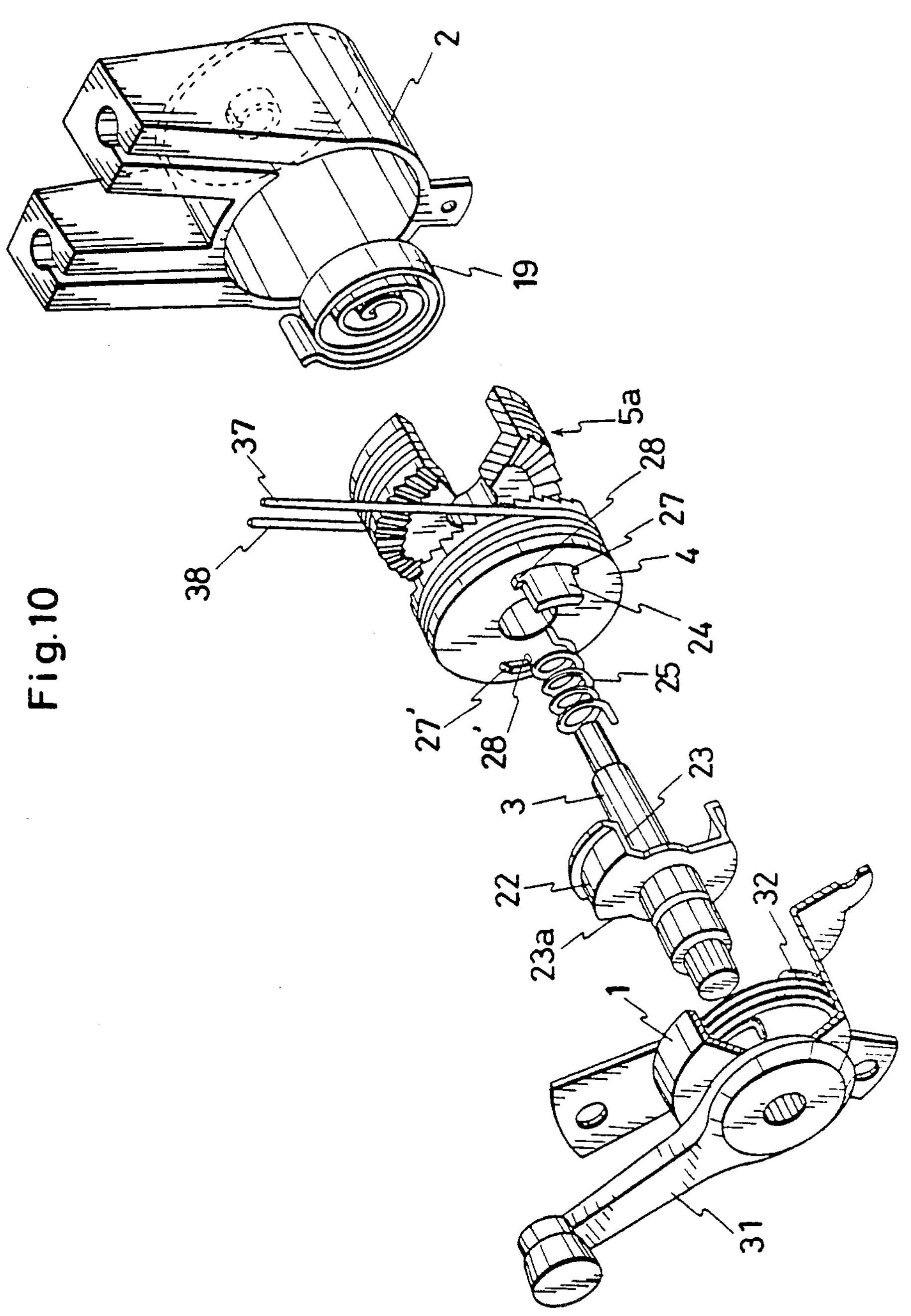
FIG. 10 is an exploded view in perspective of another embodiment of the driving device of the invention.

Also, the second pushing projection 28 is preferably provided with a small tapered portion or a small round portion, so that insertion or removal of the second pushing projection 28 into or from a gap between the bottom surface 22*a* and the first side surface 8 is made smooth. The shapes and the numbers of the first pushing projection 27 and the second pushing projection 28 are not limited. For example, as shown in FIG. 10, two first pushing projections and two second pushing projections can be arranged on a circular line, respectively. In that case, the associating member 22 can be provided with a notch portion 23*a* which is located in the opposite side of the notch portion 23 and which is provided to a portion corresponding to pushing projections 27', 28'. Generally, it is sufficient to provide with one pushing projection 28 and one pushing projection 29 on the circular line.

Also, a few number of associating projections can be mounted on the drum, and in that case, the associating member is provided with notch portions of which number is corresponding to that of the associating member.

Figure 3:
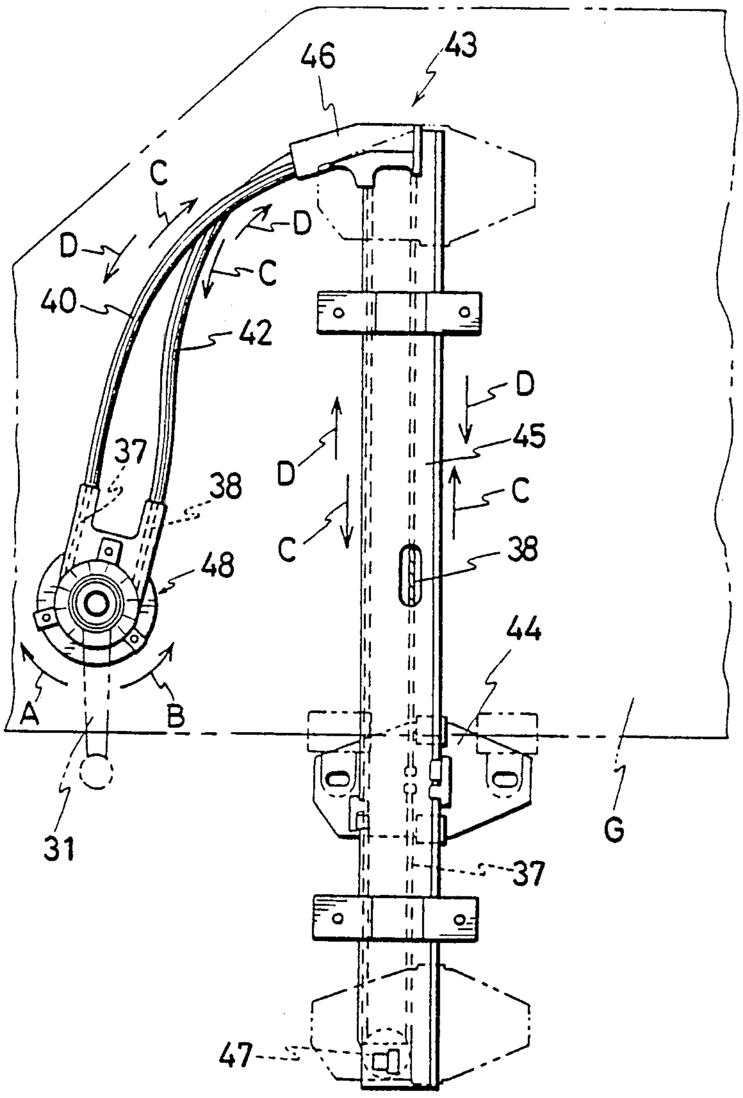
FIG. 3 is a front view showing a window regulator having the driving device of the invention.

A peripheral surface of the drum 4 is used as a winding surface 36 for winding a first wire 37 and a second wire 38. The first wire 37 and the second wire 38 are wound in the same spiral direction (in case of FIG. 2, in the spiral direction like a left handed screw), respectively. The first wire end 9 of the first wire 37 is engaged with the first engaging portion 10. The first wire 37 is spirally wound from the first side surface 8 side toward the second side surface 6 side, goes away from the drum 4 on its way, and is successively guided into a first outer casing (indicated as 40 in FIG. 1) through a first guiding groove 39 of the second housing 2. The second wire end 13 of the second wire 38 is engaged with the second engaging portion 14 of the ratchet plate 5. The second wire 38 is wound around the winding surface 36 in such direction that the wire is wound from the second side surface 6 side toward the first side surface 8 side, goes away from the drum 4 on its way, and is successively guided into a second outer casing (indicated as 42 in FIG. 1) through a second guiding groove 41. The other respective ends of the first wire 37 and the second wire 38 are engaged with a carrier plate 44 of a driven portion 43 of the window regulator, as shown in FIG. 3. Accordingly, the first wire 37 and the second wire 38 substantially form a closed loop.

Figure 5:
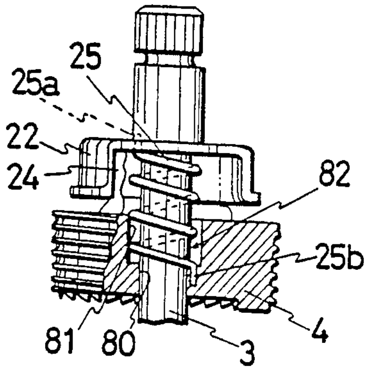

As shown in FIG. 5, a center portion of the drum 4 is provided with a first bore 80 capable of being directly in contact with the shaft 3 and a second bore 81 having a diameter which is larger than the diameter of the shaft 3. The second bore 81 is coaxial with the first bore 80. Insertion of the shaft 3 into the bores 80, 81 of the drum 4 makes a cylindrical space 82 to be formed. A coil spring 25 is set in the cylindrical space 82, and both ends 25*a*, 25*b* of the coil spring 25 are engaged with the associating member 22 and the drum 4, respectively. In that case, the coil spring 25 is given torsional deflection, so that the coil spring 25 urges the drum 4 in the direction of Arrow B, i.e. in the direction of idling movement of the ratchet teeth 7, 12.

Further, the coil spring 25 preferably urges the drum 4, which is movable in the axial direction, toward the ratchet plate 5.

Figure 4:
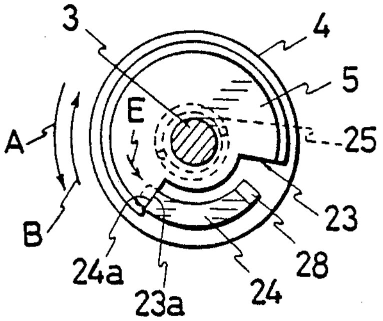
FIGS. 4–9*b* are diagrams showing the operational states of the driving device of the invention shown in FIG. 1.

If the crank lever 31 do not receive a rotational torque, the associating member 22 is urged in the direction of Arrow E by means of the coil spring 25 (shown in FIG. 4). Therefore, one side surface 23*a* of the notch portion 23 always urges a side surface 24*a* of the associating projection 24 facing to the one side surface 23*a*. The drum 4 itself is hardly rotatable, since the drum 4 is connected to the window glass (for example, indicated as G in FIG. 13) through the wires 37, 38.

Accordingly, the shaft 3 and the crank lever 31 do not rotate against the drum 4. Whereby, the shaking of the crank lever 31 is avoided.

When the crank lever 31, as shown in FIG. 2, is rotated in the direction of Arrow B, the associating member 22 rotates against the urging force of the coil spring 25 in the range of the play with the drum being stationary. Then, the other side surface 23*b* of the notch portion 23 pushes the other side surface 24*b* of the associating projection 24. As a result, the drum 4 can rotate. When the rotational operation is finished, the associating member returns in the state shown in FIG. 4 and FIG. 5.

When the crank lever 31 shown in FIG. 1 is rotated in the direction of Arrow A from the state shown in FIG. 4 and FIG. 5, the drum is directly rotated in the direction of Arrow A, since the one side surface 23*a* of the associating member 23 is previously in contact with the one side surface 24*a* of the associating projection 24. In the driving device of the invention, one nail 33 of the brake spring 32 is set between the one side surface 23*a* of the notch portion 23 and the one side surface 24*a* of the associating projection 24 with no play in the state shown in FIG. 4 and FIG. 5. On the other hand, there is some play between the other side surface 23*b* of the notch portion 23 and the other side surface 24*b* of the associating projection 24. Accordingly, the unlocking operation and the locking operation can normally behave.

The coil spring employed in the driving device of the present invention can be employed to any driving device having the drum and the driving member which are associated with each other with some play in the rotational direction. For example, the coil spring can be easily employed in a driving device of a prior art shown in FIG. 15.

Figure 15:
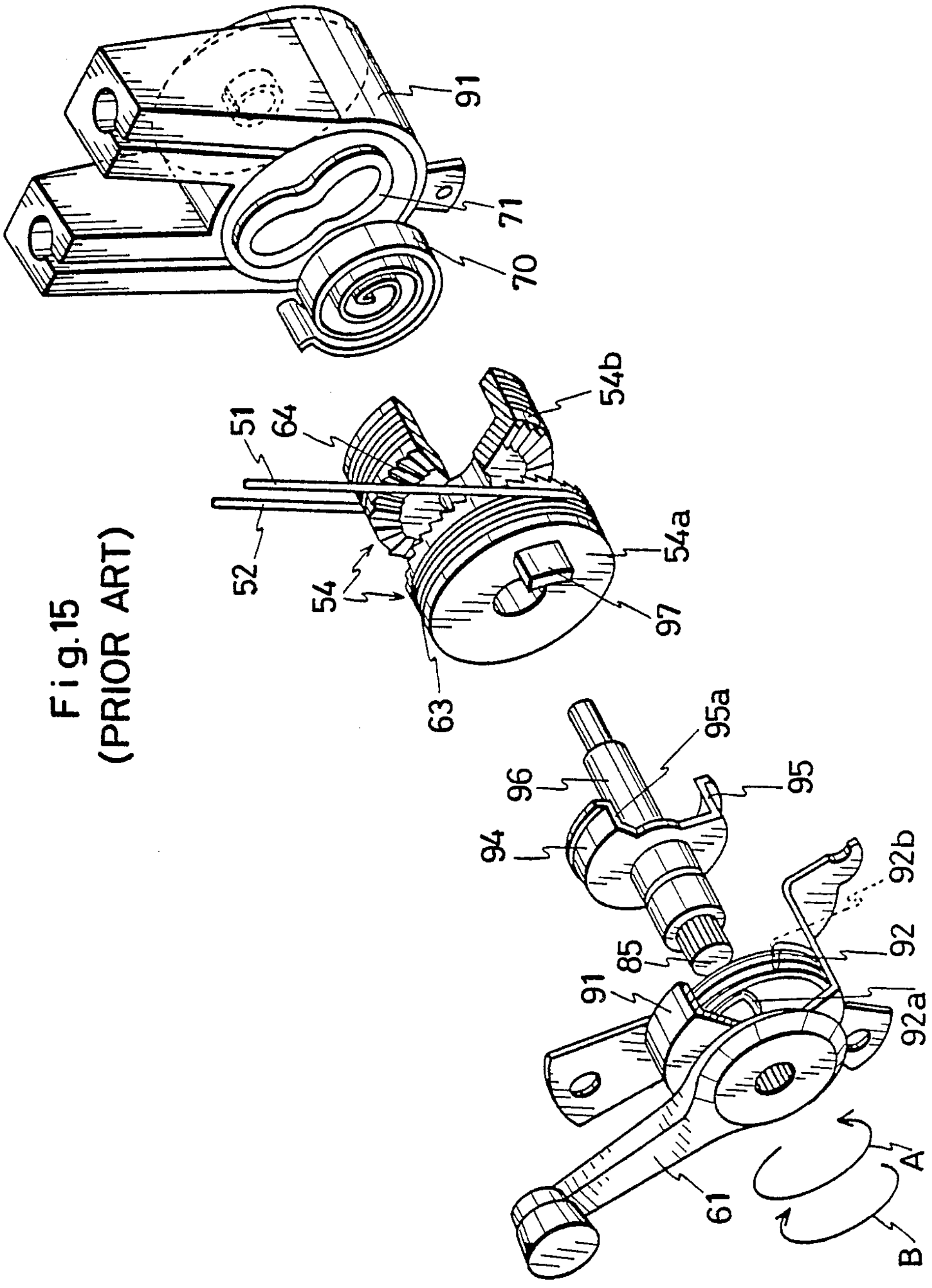
Fig.15 (PRIOR ART)
FIG. 15 is an exploded view in perspective of a driving device of the prior art.

As to the driving device shown in FIG. 15, the same spring as the coil spring shown in FIG. 2 can be set between a drum 54*a* and an associating member 94.

In the driving devices provided with a mechanism capable of automatically regulating tension of wires by means of ratchet teeth, such as the driving devices shown in FIG. 2 and FIG. 15, the coil spring 25 of the driving device of the present invention also behaves as an elastic member which urges axially one ratchet teeth toward the other ratchet teeth, so that both sets of ratchet teeth strongly mesh with each other. Accordingly, instead of a conventional waved washer 71 shown in FIG. 15, the coil spring 25 can be employed as shown in FIG. 2.

Figure 12:
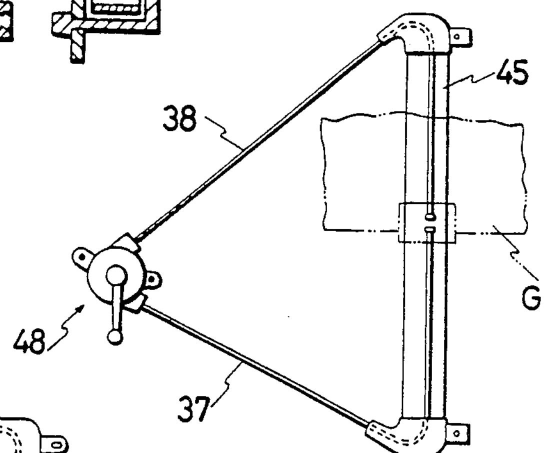
FIG. 12 and FIG. 13 are front views of a window regulator employing the driving device of the invention.
Figure 13:
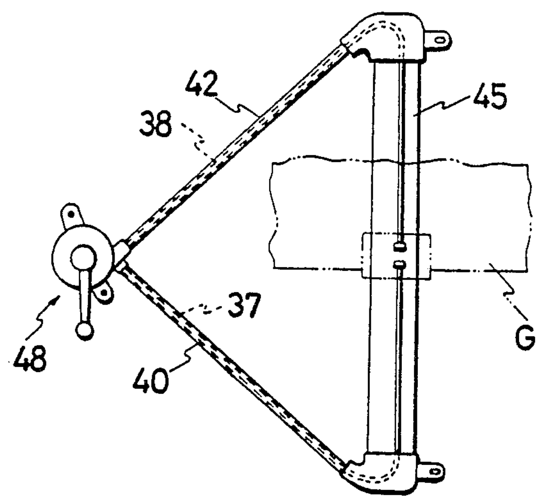
Figure 14:
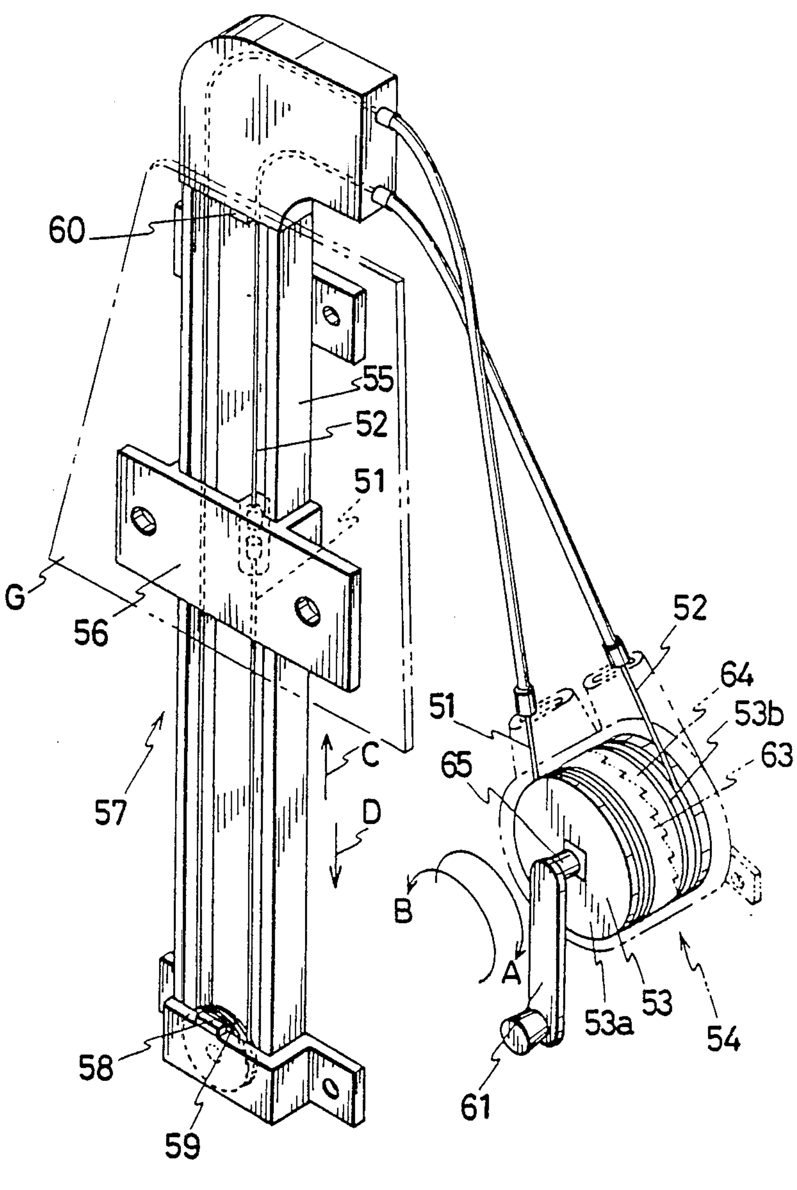
Fig. 14 (PRIOR ART)
FIG. 14 is a perspective view showing a window regulator of the prior art.

As described above, the mechanism for preventing the crank lever from shaking can be employed in various wire-driving devices or various window regulators. Namely, the mechanism of the present invention can be employed in one window regulator constructed, as shown in FIG. 12, by means of separately providing a guide rail 45 and a driving device 48 within a door panel of a car, and thereafter by means of laying wires in the window regulator in tense condition, and can be employed in the other window regulator constructed, as shown in FIG. 13, by means of connecting the driving device 48 to the guide rail 45 through outer casings 40, 42, i.e. through control cables. In that case, the control cables are pull control cables.

Hereinafter, the functions of the driving device of the invention will be described. In order to clearly describe the functions of the driving device, the mechanism employed in the window regulator shown in FIG. 3 is described as a typical case. However, the driving device of the invention is not limited to the typical case, for example, the driving device can be employed in window regulators shown in FIG. 12 and FIG. 13.

In FIG. 3, a numeral 48 indicates a driving device of a window regulator. The driven portion 43 has a guide rail 45 and a carrier plate 44 slidably mounted on the guide rail 45. In order to change the moving directions of the wires 37, 38, a wire guide (or a pulley) 46 is mounted on the upper end of the guide rail 45. Similarly, in order to change the moving directions of the wires 37, 38, a pulley (or wire guide) 47 is mounted on the lower end of the guide rail 45.

First and second outer casings 40, 42 slidably guide first and second wires 37, 38, respectively, that is to say, control cables are employed in the window regulator. In that case, the control cables are pull control cables.

In such window regulator, when the crank lever 31 is rotated in the direction of Arrow A, the second wire 38 is wound around the drum 4 and the first wire 37 is unwound from the drum 4. Therefore, the closed loop circulates in the direction of Arrow C, and a window glass G fixed to the carrier plate 44 is raised. In case that the crank lever 31 is rotated in the direction of Arrow A, the drum 4 and the ratchet plate 5 rotate together in the same direction, since the first ratchet teeth 7 and the second ratchet teeth 12 are firmly meshed with each other.

Further, in case that the crank lever 31 is rotated in the direction of Arrow B, the first wire 37 is wound around the drum 4 and the second wire 38 is unwound from the drum 4. Therefore, the closed loop circulates in the direction of Arrow D, and the window glass G is lowered. In that case, the drum 4 is not rotated in such direction that the first ratchet teeth 7 is not meshed with the second ratchet teeth 12, but the drum 4 and the ratchet plate 5 rotate together in the same direction, since the tension of the second wire 38 is given to the ratchet plate 5, and since the coil spring 25 axially urges the drum toward the ratchet plate.

As shown in FIG. 4 and FIG. 5, in case that the crank lever 31 is not given a torque, the side surface 23*a* of the notch portion 23 is in contact with the side surface 24*a* of the associating projection 24. The former urges the latter. Further, it is not easy to rotate the drum 4 itself because of receiving the tension of the wires 37, 38. Therefore, the shaking of the crank lever 31 does not occur.

Figure 9:
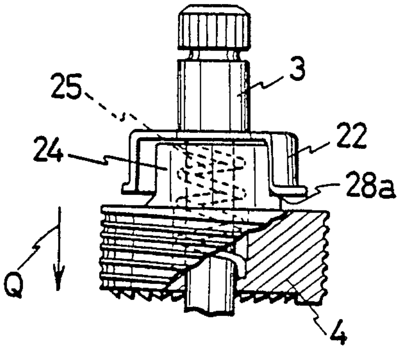
Figure 9A:
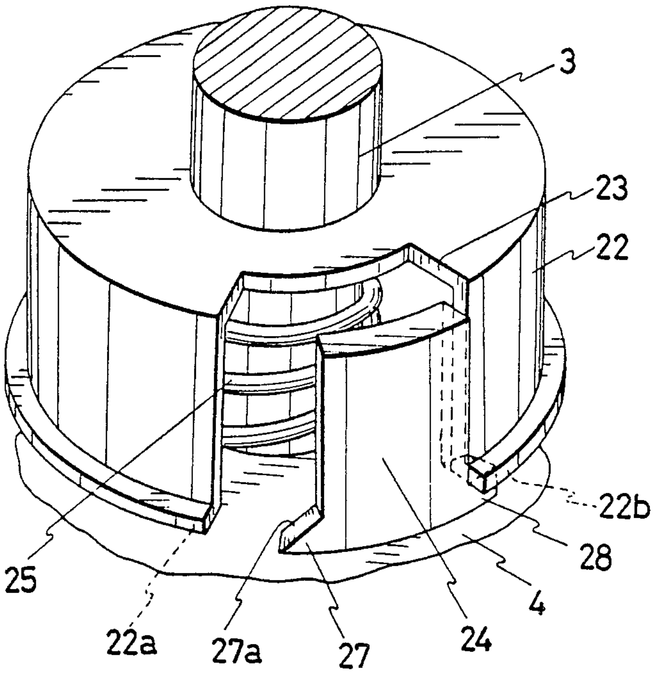
Figure 9B:
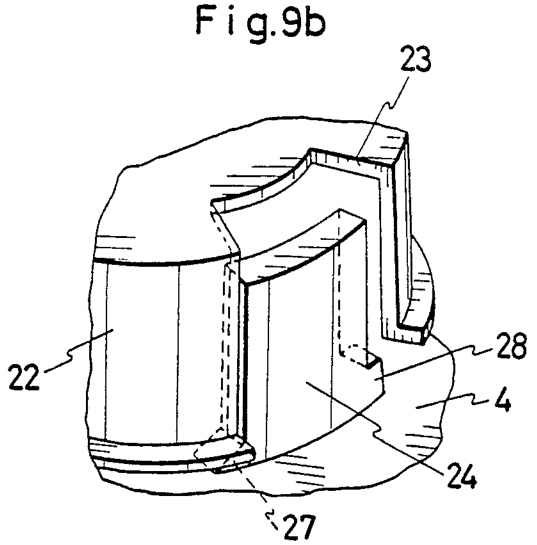

During the crank lever 31 is rotated in the direction of Arrow A or in the direction of Arrow B, the first pushing projection 27 or the second pushing projection 28 is in the state of being inserted between the bottom surface 22*a* or 22*b* of the associating member 22 and the first side surface 8 of the drum 4 (as shown in FIG. 9*a* and FIG. 9*b*). As a result, the drum 4 cannot move toward the associating member 22 side on the shaft 3, and the drum 4 is pushed toward the ratchet plate 5. Accordingly, the flying phenomenon of the ratchet teeth 7, 12 is avoided and excessive elastic elongation due to idling movement does not occur in the wires 37, 38.

In the driving device of the invention, looseness of each wire 37, 38 is eliminated, as described later.

Figure 6:
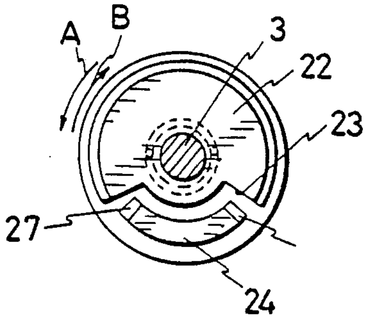
Figure 7:
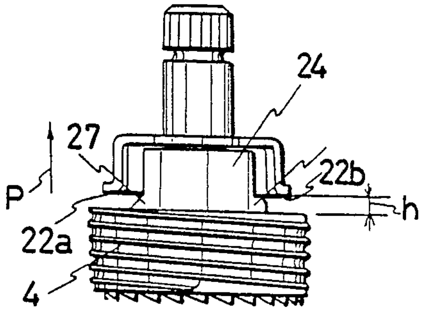
Figure 8:
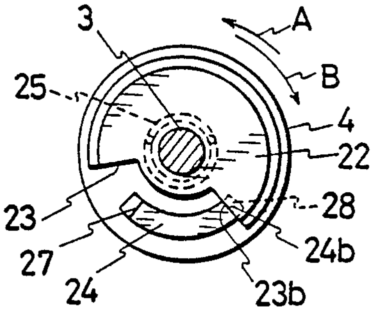

When the crank lever 31 is rotated in the direction of Arrow B, the side surface **23*b* of the notch portion 23 is in contact with the side surface 24*b* of the associating projection 24 in the state shown in FIG. 8 and FIG. 9. Then, when the crank lever 31 becomes free from one's hand at the same time when the rotation of the crank lever 31 is stopped, the crank lever 31 rotates in the direction of Arrow A shown in FIG. 8 due to the urging force of the coil spring 25, and returns to the state shown in FIG. 4 and FIG. 5 through the state shown in FIG. 6 and FIG. 7. In the state shown in FIG. 6 and FIG. 7, neither the first pushing projection 27 nor the second pushing projection 28 is inserted between the bottom surface 22*a* or 22*b* of the associating member 22 and the first side surface 8 of the drum 4. Therefore, the drum 4 can move in the direction of Arrow P by a gap h. Accordingly, looseness or permanent elongation generated in the wires 37, 38 is easily eliminated owing to idling movement of the ratchet teeth 7, 12 by means of the operation of the spiral spring 19, on the way from the state shown in FIG. 8 and FIG. 9 to the state shown in FIG. 4 or FIG. 5**.

As shown in FIG. 2, the spiral spring 19 having one end 20 inserted into the first engaging groove 17 of the boss 16 of the ratchet plate 5 and having the other end 21 inserted into the second engaging groove 18 of the inner peripheral surface of the second housing 2 is preferably employed, since the size of the spiral spring 19 is not limited by the size of the drum 4.

Figure 11:
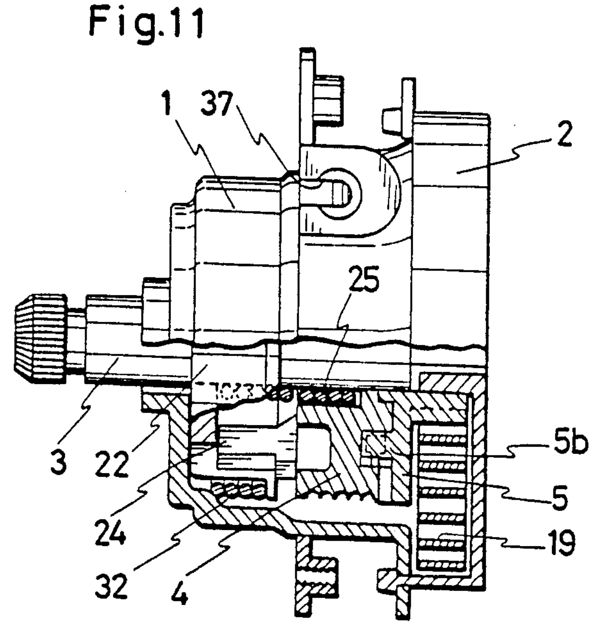
FIG. 11 is a partially cutaway side view of another embodiment of the driving device of the invention.

The ratchet member in the present invention is not limited to the ratchet plate 5. As shown in FIG. 10, as a ratchet member, a ratchet drum **5*a*, with its configuration similar to the drum 4, capable of winding the second wire 38 around the outer peripheral surface can be employed. Further, as shown in FIG. 11, a ratchet plate 5 having a small cylindrical projection 5*b* which is contained within the drum 4 and which is capable of winding an end portion of the second wire 38** around the peripheral surface thereof, can be employed as a ratchet member.

Though the direction of the relative torque of the drum 4 and the associating member 22 owing to the elastic member (e.g. the coil spring 25 shown in FIG. 5) is not limited, the direction of the torque owing to the elastic member is preferably the direction in which the drum 4 is rotated in the direction of meshing the ratchet teeth 7 with the ratchet teeth 12. Just after the crank lever 31 is rotated in the direction of idling movement of the ratchet teeth 7, 12, the associating member 22 is rotated by the coil spring 25. Therefore, looseness and permanent elongation of the wires can be smoothly eliminated.

As described above, the driving device of the invention has effects that looseness and permanent elongation of the wire can be eliminated, that tension of the wires is maintained in a suitable range because flying phenomenon is inhibited, and that the shaking of a crank lever is surely avoided.

Though several embodiments of the invention are described in detail, it is to be understood that the present invention is not limited to the above embodiments, and various changes and modifications may be made in the invention without departing the spirit and the scope thereof.

What is claimed is:

1. A driving device employed in a window regulator comprising:

(a) housing;

(b) a driving member including a shaft provided for rotational movement within said housing and an associating member being fixed to said shaft, said associating member extending from said shaft in the radial direction and having at least one notch portion along a peripheral edge of said associating member;

(c) a drum being provided within said housing, being adjacent to said associating member, being coaxial with said shaft, being rotatable around said shaft, being axially movable along said shaft and having an associating projection, said associating projection being mounted on a first side surface of said drum facing to said associating member, and being capable of associating said notch portion with some play in the rotational direction;

(d) an elastic means for urging said associating member in the rotational direction and for biasing said drum away from said associating member, by engagement of one end of said elastic means with said drum and by engagement of the other end of said elastic means with said associating member; and (e) a brake spring set between an outer peripheral surface of said associating member and an inner peripheral surface of said housing having ends inserted into gaps between said notch portion and said associating projection.

2. The driving device of claim 1, wherein said elastic means is a torsional coil spring.

3. The driving device of claim 1, wherein said drum has first ratchet teeth on a second side surface of said drum opposite to said first side surface and wherein said driving device further comprises (f) a ratchet member provided within said housing, adjacent to said drum, coaxial with said shaft, rotatable around said shaft, and having second ratchet teeth on a first side surface of said ratchet member facing to said drum, said second ratchet teeth being capable of being meshed with said first ratchet teeth, (g) a spiral spring located between said housing and said ratchet member and urging said ratchet member in the direction of idling movement of said first ratchet teeth and said second ratchet teeth, (h) a first wire having an end engaged with said drum and a second wire having an end engaged with said ratchet member, and (i) a first pushing projection and a second pushing projection being mounted on both low sides of said associating projection, and being capable of being inserted between bottom surfaces of said associating member and said first side surface of said drum, respectively.

4. The driving device of claim 3, wherein said elastic means urges said drum and said associating member in the direction of idle movement of said first and second ratchet teeth.

5. The driving device of claim 3, wherein said ratchet member is a ratchet plate.

6. The driving device of claim 3, where said ratchet member is a ratchet drum capable of winding said second wire on a peripheral surface thereof.

* * * * *